United States Patent [19]

Smith

[11] 3,915,674

[45] Oct. 28, 1975

[54] REMOVAL OF SULFUR FROM POLYETHER SOLVENTS

[75] Inventor: James R. Smith, Plattsmouth, Nebr.

[73] Assignee: Northern Natural Gas Company, Omaha, Nebr.

[22] Filed: Dec. 26, 1973

[21] Appl. No.: 427,510

[52] U.S. Cl. .............................. 55/48; 55/52; 55/73; 210/21; 260/616
[51] Int. Cl.² ..................... B01D 47/00; B01D 53/00; B01D 59/24; B01D 11/04
[58] Field of Search ........ 55/48, 52, 59, 73; 210/21; 260/615 B, 616

[56] References Cited
UNITED STATES PATENTS

| | | | |
|---|---|---|---|
| 3,582,491 | 6/1971 | Louvar et al. | 204/186 |
| 3,653,183 | 4/1972 | Sanders et al. | 55/56 |
| 3,748,827 | 7/1973 | Bulian et al. | 55/73 |
| 3,769,205 | 10/1973 | Williams | 210/21 |

*Primary Examiner*—Frank A. Spear, Jr.
*Assistant Examiner*—Ferris H. Lander
*Attorney, Agent, or Firm*—Donald F. Haas

[57] ABSTRACT

Described herein is a method for removing residual sulfur from polyether solvents, especially those solvents which are utilized to remove hydrogen sulfide and carbon dioxide from sour natural gas streams. The first step of the method is to mix the sulfur-containing polyether solvent with carbon disulfide which dissolves the sulfur therein. Next, the polyether solvent is extracted from the mixture with water. Finally, the purified polyether solvent is recovered by distilling out the water and filtering the residue which contains the polyether solvent.

7 Claims, No Drawings

REMOVAL OF SULFUR FROM POLYETHER SOLVENTS

BACKGROUND OF THE INVENTION

The removal of hydrogen sulfide and carbon dioxide from sour natural gas has been a problem in the natural gas industry. Various methods for solving this problem have been proposed and utilized in the past. One such method utilizes polyether solvents to dissolve hydrogen sulfide and carbon dioxide out of a sour natural gas stream and is described in general in U.S. Pat. No. 3,653,188 by Sanders, et al., entitled "Methyl Ethers of Polyalkoxylated Polyols for Removing Acidic Gases from Gases," patented Apr. 4, 1972, at column 3, lines 41–53.

The process described in the above patent is very useful in scrubbing sour natural gas streams of unwanted hydrogen sulfide and carbon dioxide. However, a slow build-up of residual elemental sulfur and other sulfur compounds in the polyether solvent tends to occur, thus reducing the efficacy of the solvent and increasing the cost of the process. Removal techniques such as heating and vigorous air stripping do not lessen this problem to any significant degree. Therefore, it is an object of the present invention to provide a method by which elemental sulfur and sulfur compounds can be removed from such a polyether solvent in a beneficial and economical manner.

U.S. Pat. No. 3,582,491, "Removal of Inorganic Catalysts from Polyols" by Louvar and Nichols, patented June 1, 1971, discloses a method for removing water-soluble impurities from water-insoluble polyethers. These impurities are removed by mixing the polyethers with water and a polyether water-insoluble solvent having a density different from water, allowing two phases to form, and then separating the phases by electrostatic coalescence, the impurities being dissolved in the water phase and the polyether being dissolved in the solvent phase. Suitable solvents for use in this invention are non-polar and include butanes, pentanes, heptanes, octanes, as well as many others. This invention appears to take advantage of water's affinity for the water-soluble impurities (alkali metal hydroxide catalysts) and the solvent's affinity for the polyether, both of them being non-polar. However, as will be seen from the following description, the applicant's invention takes advantage of a novel and heretofore undiscovered property of the polyether compounds described below, said property allowing extraction of these polyether compounds in water from a non-polar solvent phase which, in turn, carries away the sulfur and other sulfur compounds.

SUMMARY OF THE INVENTION

Briefly, the present invention describes a method for removing elemental sulfur and sulfur compounds from polyether compounds which are polyoxyalkylene alcoholethers. These compounds can be described more specifically by the following generic formula:

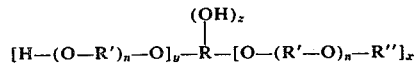

Wherein R is a straight chain alkyl group having 1 to 6 carbon atoms, R' is an alkyl group having 2 to 6 carbon atoms, R'' is an alkyl group having 1 to 6 carbon atoms, $n$ ranges from 1 to 15, $x$ ranges from 1 to 6, and $y$ and $z$ range from 0 to 5. Generally, for best solvent activity, $y$ and $z$ should range from 0 to 2 and $y + z$ should be 2 or less.

The steps of the method of the applicant's invention are as follows:

I. The polyether compound is mixed with a non-polar reactive solvent, such as carbon disulfide.
II. The polyether compound is extracted from this mixture with a polar solvent, such as water. Polyether-water and sulfur-carbon disulfide phase form and are separated.
III. The polyether compound and the non-polar reactive solvent are purified.

This method is well suited to be utilized in a process, such as that described in U.S. Pat. No. 3,653,183, for removing acid gas constituents, such as carbon dioxide and hydrogen sulfide, from gases rich in hydrogen and hydrocarbons, such as synthesis gas and natural gas. The treatment of natural gas, gaseous lower alkane hydrocarbons, hydrogen, and nitrogen containing one or more acid gases with the above-described polyether solvents is carried out using conventional absorption procedures, wherein the gaseous mixture is contacted with the solvent under pressure in a countercurrent absorption tower in a continuous flow method. The acid gas-enriched solvent is continuously withdrawn from the absorption tower and is introduced into a flash chamber to remove the absorbed acid gases by reduction of pressure. A vacuum flash or air stripping column may also be used as a final step to further reduce the acid gas content of the solvent. The regenerated solvent is then recycled through the absorption tower where it is used again. The invention herein could be used as an improvement upon the above process whereby the build-up of sulfur and sulfur compounds in the polyether solvent would be prevented.

DESCRIPTION OF THE PREFERRED EMBODIMENTS

The non-polar reactive solvents used in the method of the present invention must have the following characteristics: (1) ability to dissolve sulfur and sulfur compounds, (2) miscible with the above-described polyether compounds, and (3) immiscible with the particular polar solvent used.

Generally, the solvents with these characteristics are non-polar and thus have little or no dipole moment. In other words, the atoms, electrons, and nuclei of these molecules are arranged so that no part of the molecule is positively or negatively charged. Symmetrical molecules, such as carbon disulfide and benzene, fall within this description and can be utilized in the method of this invention. Other solvents such as toluene, trichloroethane, and 1,2-dichloroethane can also be used, but carbon disulfide is preferred because it is cheap and is easily separated from the dissolved sulfur and sulfur compounds by distillation.

Again generally, solvents with the above characteristics are reactive, i.e., their molecules contain atoms which are highly electo-negative and thus exert a strong attraction for electrons outside the atoms. It is theorized that the electronegativity of these non-polar reactive solvents allows them to both dissolve sulfur and sulfur compounds and be miscible in the polyether compounds described above.

The polar solvents used in the method of the present invention must have the following characteristics: (1) miscible with the above-described polyether compounds, (2) immiscible with the particular non-polar reactive solvent used, and (3) easily separable from the polyether compounds. Generally, solvents with these characteristics are polar and have significant dipole moments. The atoms, electrons, and nuclei of the molecules of these solvents are arranged so that one part of the molecule is positively charged and another part is negatively charged, such that the molecule is like a small magnet or dipole. It is theorized that the dipole nature of the polar solvents enables them to be both miscible with the polyether compounds and immiscible with the non-polar reactive solvents. For instance, it is believed that the solution bond between water and the polyether compounds is a result of the attraction of the oxygen atoms in the polyether compounds for the positively charged hydrogen atoms of water. Water is highly preferred for use herein because it is cheap and can be easily separated from the polyether compounds by distillation because their boiling points are very different.

It can be seen from the above that the polyether compounds used herein are miscible in the non-polar reactive solvents described above, but that when a polar solvent is added to a mixture of the two the polyether compounds become relatively immiscible in the non-polar reactive solvents and miscible in the polar solvent. The former characteristic allows the non-polar reactive solvent to dissolve the sulfur and sulfur compounds which are present in the polyether compound. The latter characteristic allows easy separation of the polyether compound from the non-polar reactive solvent. It is this unique and unexpected combination of properties of the polyether compounds which allows the removal of sulfur and sulfur compounds by this relatively inexpensive method. It is theorized that the bond between the polyether compound and the polar solvents is considerably stronger than the bond between the polyether compound and the non-polar reactive solvents and that this causes the polyether compound to associate with the polar solvent and reject the non-polar reactive solvent.

It is preferred that the volume ratio of non-polar reactive solvent to polyether compound to polar solvent be about 3:1:3. This ratio produces a high separation of sulfur and a high recovery of polyether compound, but its main advantage is in the speed and ease of separation of the phases during extraction. This is especially true when carbon disulfide and water are used, so slightly different ratios may be best if other solvents are to be used.

Additional extractions of the sulfur-non-polar reactive solvent phase may be used in order to recover residual polyether compound therein. The polyether-polar solvent phases from these extractions may be recycled and used in the initial extraction since they are relatively dilute solutions of polyether compound in polar solvent. This saves the expense of purifying these dilute streams and the residual polyether compound can still be recovered.

It is preferable that the non-polar reactive solvent be purified and recycled. This can be accomplished in many ways but, especially in the case of carbon disulfide, distillation is preferred.

EXAMPLE 45 milliliters of carbon disulfide and 15 milliliters of polyethylene glycol dimethyl ether having the following formula:

$$H_3C-O-(CH_2-CH_2-O)_n-CH_3$$

and the following chain length distribution:

| n | % |
|---|---|
| 1 | 0.5 |
| 2 | 1.3 |
| 3 | 20.5 |
| 4 | 27.6 |
| 5 | 25.0 |
| 6 | 18.7 |
| 7 | 6.3 | which had been used as the solvent in a commercial process like that described in U.S. Pat. No. 3,653,183 and contained 1.23% sulfur, were placed in a beaker and thoroughly mixed with a magnetic stirrer. Then 45 milliliters of water was added and the three components were thoroughly mixed and allowed to stand for 5 minutes in a separatory funnel.

The bottom layer (45 milliliters of carbon disulfide with sulfur dissolved therein) was drawn off. Then it was distilled in a small distillation flask at up to 55°C and 41.5 milliliters of carbon disulfide was recovered as the distillate for a 92.2% recovery. The residue, containing sulfur, and some polyether compound and water, was 1.6 milliliters.

The top layer (60 milliliters of water and polyether compound) was distilled in a small distillation flask at up to 109°C, and all 45 milliliters of water was recovered as the distillate while 14 milliliters of polyether compound was recovered as the residue (which was filtered) for a 93.3% recovery. The purified polyether compound contained 0.28% sulfur and thus 77.1% of the sulfur was removed.

Many other ratios of the three components were also tested, but the 3:1:3 ratio proved to be the best overall in terms of percent recovery and ease and speed of separation of the phases.

The above example is offered for purposes of illustration only and is not intended to limit the invention described herein in any way.

I claim:

1. A method for removing elemental sulfur and sulfur compounds from polyether compounds which are polyoxyalkylenealcoholethers, said method comprising the steps of:

a. mixing said polyether compound with a non-polar reactive solvent said non-polar reactive solvent being characterized in that it is miscible with the above described polyether compound and further by its ability to dissolve sulfur and sulfur compounds;

b. extracting the polyether compound from the mixture with a polar solvent, polar solvent being characterized in that it is miscible with the above described polyether compounds, is immiscible with the partifular non-polar reactive solvent used, and is easily separable from the polyether compounds, whereby polyether-polar solvent and sulfur-nonpolar reactive solvent phases are formed and separated; and c. removing the polar solvent from the polyether compound to produce purified polyether compound.

2. A method as described in claim 1 and further characterized in that the polyether compound is selected from the group comprising compounds having the formula:

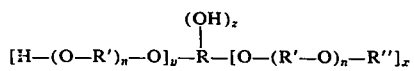

Wherein R is a straight chain alkyl group having 1 to 6 carbon atoms, R' is an alkyl group having 2 to 6 carbon atoms, R'' is an alkyl group having 1 to 6 carbon atoms, n ranges from 1 to 15, $x$ ranges from 1 to 6, $y$ and $z$ range from 0 to 2 and $y + z$ is not more than 2.

3. A method as described in claim 1 and further characterized by the additional steps of purifying the non-polar reactive solvent and recycling the non-polar reactive solvent for use in step (a).

4. A method as described in claim 3 and further characterized by the additional step of extracting the sulfur-non-polar reactive solvent phase at least one additional time prior to said purification and recycle to remove residual polyether compound therefrom.

5. A method as described in claim 3 and further characterized in that the volume ratio of non-polar reactive solvent to polyether compound to polar solvent is about 3:1:3; in that the polar solvent is water and is removed from the polyether compound by distillation; and in that the non-polar reactive solvent is carbon disulfide and is purified by distillation.

6. In a process for the removal of acid gas constituents from admixture with other gases selected from the group consisting of natural gas, hydrogen, nitrogen, and lower alkane hydrocarbons which comprises contacting the gaseous admixture at super-atmospheric pressure with a polyether solvent which is a polyoxyalkylene alcohol ether, and then removing the dissolved acid gases from the enriched polyether solvent, the improvement which comprises removing residual sulfur and sulfur compounds from the polyether solvent by mixing the polyether solvent with a non-polar reactive solvent, said non-polar reactive solvent being characterized in that it is miscible with the above described polyether compound and further by its ability to dissolve sulfur and sulfur compounds extracting the polyether solvent from the mixture with a polar solvent, said polar solvent being characterized in that it is miscible with the above described polyether compounds, is immiscible with the particular non-polar reactive solvent used, and is easily separable from the polyether compounds, whereby polyether solvent-polar solvent and sulfur-non-polar reactive solvent phases are formed and separated, and removing the polar solvent from the polyether solvent to produce purified polyether solvent.

7. The method as described in claim 1 and further characterized in that the polar solvent is water and the non-polar reactive solvent is selected from the group consisting of carbon disulfide, benzene, toluene, trichloroethane, and 1,2-dichloroethane.

* * * * *